A. GEERING.
WHEEL TIRE.
APPLICATION FILED JULY 15, 1915.
1,159,925.
Patented Nov. 9, 1915.
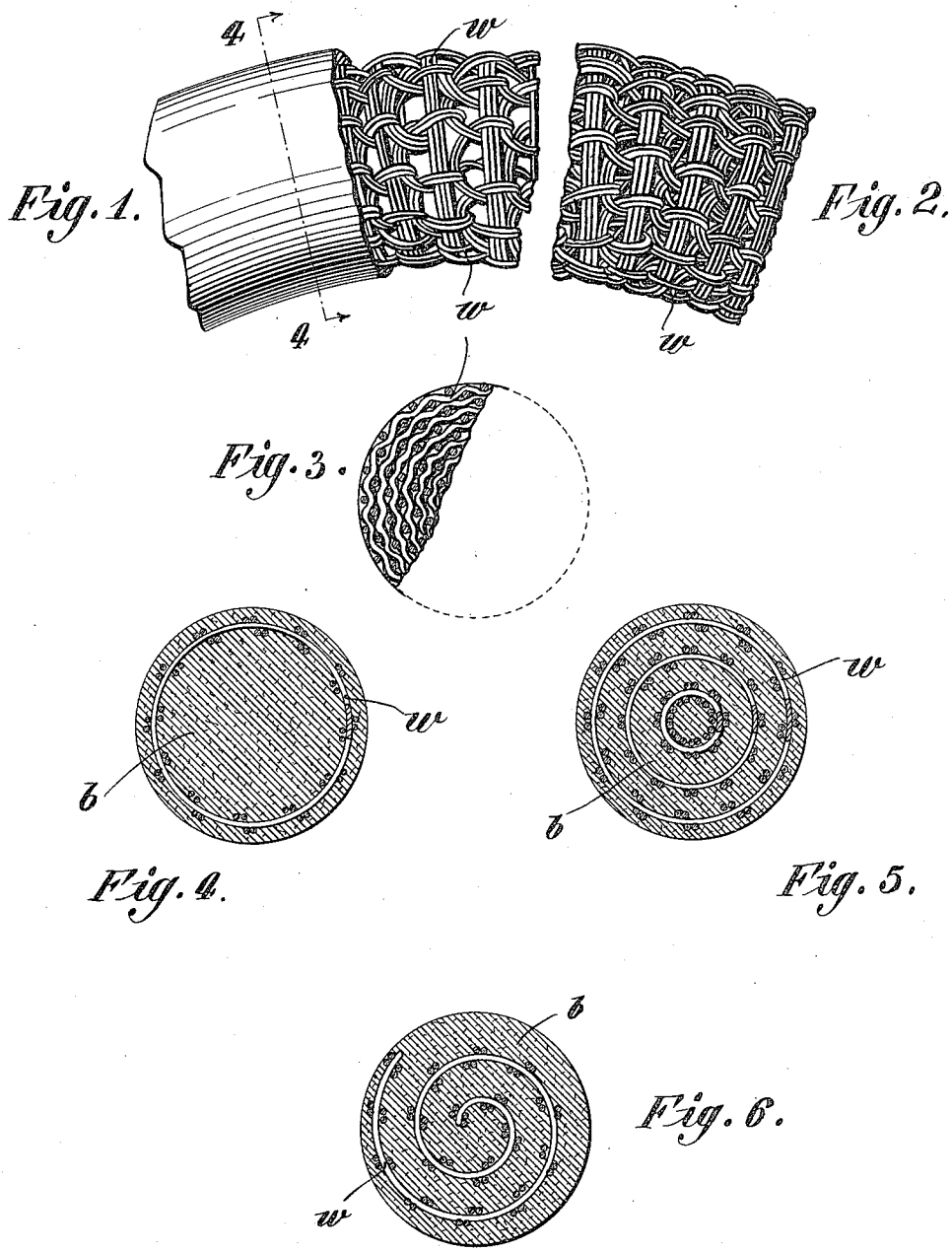

UNITED STATES PATENT OFFICE.

ADOLPH GEERING, OF NEW YORK, N. Y.

WHEEL-TIRE.

1,159,925.   Specification of Letters Patent.   Patented Nov. 9, 1915.

Application filed July 15, 1915. Serial No. 39,949.

*To all whom it may concern:*

Be it known that I, ADOLPH GEERING, a citizen of the United States, and a resident of the borough of Manhattan, city, county, and State of New York, have invented certain new and useful Improvements in Wheel-Tires, of which the following is a specification.

While applicable to wheel tires generally my invention is designed more particularly for automobile tires and the like where an elastic resilient tread is desirable if not indispensable in a practical sense. As is well known such elastic resilient tires, whether of the pneumatic or solid types or variations thereof, are expensive, and are subject to puncture, collapse, and rapid deterioration and disintegration under ordinary conditions of use, besides being relatively heavy and complicated of structure.

The main object of my invention is to afford a comparatively cheap yet substantial and effective non-collapsible tire of the character designated, combining lightness, strength, and tenacity with a relatively high degree of elasticity and resilience.

The invention consists essentially in a wheel tire made in whole or in part of woven vegetable reed, the material being fabricated when in a soft pliable condition to form either the whole or an essential part of the tire, as hereinafter more fully set forth.

In the accompanying drawings,

Figure 1, represents a side elevation of a portion of a tire composed of a body weave of vegetable reed combined with an elastic composition in which the woven reed is embedded,—the weave being shown protruding on the right of the figure; Fig. 2, represents a side elevation of a portion of a tire composed wholly of woven reed; Fig. 3, is a partial cross section of a tire composed wholly or mainly of woven vegetable reed; Fig. 4, is a cross section on the line 4—4 of Fig. 1 of a tire in which the woven reed is used simply as a circumferential reinforcement; Fig. 5, is a cross section in which a plurality of reed weaves are incorporated in an elastic composition; Fig. 6, is a cross section showing a modification in which the woven reed is arranged spirally.

It is to be understood that by the term "reed" I herein mean to designate any vegetable culm, stem, cane or growth suitable for the purpose, that what is known commercially as "Spanish cane" being a good specimen of material adapted to the requirements of this special use, as affording a high degree of elasticity, strength and resilience, especially after being woven into a suitable fabric or structure. This has been fully demonstrated by the successful and predominating use of "Spanish cane" in the manufacture of fenders for marine vessels, in which the woven reed fabric is subjected to the severest pressure upon occasion without rupture, and without impairing its extremely elastic and resilient qualities.

In the preparation of the woven reed fabric for my tire the vegetable fiber is rendered pliable by moisture to admit of the necessary manipulation, and after drying and curing the product assumes an exceptional degree of elasticity and resilience, as above intimated. The cured product is also essentially water proof, which is another advantage in its use in the manufacture of tires. And it may be entwined and interlaced in an infinite variety of weaves, both of weft and warp, to suit the requirements which the tire is specifically designed to meet. In the accompanying drawings this, of course, is indicated more or less symbolically, as I do not wish to confine myself to any particular form or pattern of weave, nor to the proportions of woven reed used or incorporated in the formation of the tire. Thus in Figs. 2, and 3, the weave *w*, may constitute practically the whole of the tire in cross section, either with or without an elastic embedment *b*, whereas in the other figures the latter forms a relatively large proportion of the tire in cross section,—the elastic embedment *b*, in either case filling in the interstices between the warp and woof of the weave *w*, and constituting an integral part of the tire,—acting in fact as a binder to insure and maintain the resilient woven fabric *w*, in position.

While the woven reed fabric *w* will usually afford the requisite degree of resilience, the embedment *b* may also be of a resilient composition, such as rubber or any of the compounds thereof or therewith used in the manufacture of tires. In other words this degree of resiliency of the woven reed fabric is so great that it may be relied upon as the main stay of the tire, although a filling or embedment *b*, which is both elastic and resilient may be an important adjunct in many kinds of tires where quick responsive reaction is desirable. In any case the cheapness, lightness, and tenacity of the woven reed fabric *w*, renders it an important factor in my improved tire, used as a substitute, in whole or in part, for rubber or compounds thereof, or for the pneumatic tire.

Furthermore my tire is non-collapsible, and essentially puncture proof, in that an ordinary cut or puncture will not materially injure the tire nor render it unavailable for continuous use. And its "life" or durability far exceeds that of an ordinary elastic resilient tire. But aside from the question of strength and durability of my improved tire, its lightness and cheapness renders it an important advance in the state of the art.

What I claim as my invention and desire to secure by Letters Patent is,

1. A wheel tire of the character designated embodying an elastic resilient filling of unsplit cane interwoven intact, and an elastic embedment filling the interstices in said woven filling.

2. A wheel tire of the character designated comprising an elastic resilient filling of unsplit reed interwoven intact, and elastic material in which said filling is embedded and which fills the interstices of the said filling forming a solid tire.

ADOLPH GEERING.

Witnesses:
GEO. WM. MIATT,
DOROTHY MIATT.

Copies of this patent may be obtained for five cents each, by addressing the "Commissioner of Patents, Washington, D. C."